SEMI-CONDUCTOR DEVICE HAVING MEANS PRESSING A CONNECTOR INTO CONTACT WITH A SEMI-CONDUCTOR DISC

Filed Jan. 25, 1968 2 Sheets-Sheet 1

INVENTOR.
NILS-ERIC ANDERSSON
BY GORAN LILJA
Jennings Bailey, Jr

SEMI-CONDUCTOR DEVICE HAVING MEANS PRESSING A CONNECTOR INTO CONTACT WITH A SEMI-CONDUCTOR DISC

Filed Jan. 25, 1968 2 Sheets-Sheet 2

INVENTOR.
NILS-ERIC ANDERSSON
BY GORAN LILJA
Jennings Bailey, Jr.

United States Patent Office
3,512,053
Patented May 12, 1970

3,512,053

SEMI-CONDUCTOR DEVICE HAVING MEANS PRESSING A CONNECTOR INTO CONTACT WITH A SEMI-CONDUCTOR DISC

Nils Eric Andersson and Goran Lilja, Vasteras, Sweden, assignors to Allmanna Svenska Elektriska Aktiebolaget, Vasteras, Sweden, a Swedish corporation Filed Jan. 25, 1968, Ser. No. 700,466
Int. Cl. H01l *1/14*
U.S. Cl. 317—234 8 Claims

ABSTRACT OF THE DISCLOSURE

A semi-conductor device comprises a semi-conductor system in conductive contact with a connector. The semi-conductor system and connector are enclosed between a cooling body forming a base and a cap, and are pressed against each other by a pressure body arranged in the cap. The pressure body and the connector have mating doubly-curved surfaces.

BACKGROUND OF THE INVENTION

Field of the invention

The invention relates to a semi-conductor system comprising a semi-conductor disc against which a connector is pressed by a pressure member enclosed within a cap.

The prior art

Semi-conductor devices for high current strengths usually comprise a semi-conductor system with a semi-conductor disc of silicon or germanium which on one or both sides may be supported by a supporting plate attached to the semi-conductor disc by means of welding or alloying and consisting of a material having approximately the same coefficient of thermal expansion as the semi-conductor material, for example molybdenum or tungsten. In known embodiments of such semi-conductor devices the semi-conductor system is often arranged in pressure contact with connection bodies for the supply and withdrawal of electric current, at least one of the connection bodies being usually connected to a cooling body for the semi-conductor system or itself acting as a cooling body. The pressure contact between a connection body and the semi-conductor system can then be effected by a compressing means comprising a pressure body pressed against the connection body.

SUMMARY OF THE INVENTION

The present invention relates to a semi-conductor device where the pressure contact is effected in the manner mentioned above and where the surfaces of the connection body and of the pressure body facing each other are given a special shape. Due to this special shape of the surfaces an even pressure is automatically ensured over the whole surface between the connection body and the semi-conductor system where the pressure contact is arranged. Thus all risk of the semi-conductor system being subjected to shearing strain due to uneven loading is avoided. This might otherwise lead to cracks arising in the semi-conductor system or to its being destroyed in some other manner, for example due to local current heating due to the uneven contact pressure. The present invention thus relates to a semi-conductor device, for example a transistor, a thyristor or a crystal diode, in which a semi-conductor system is arranged in current conducting contact with a connection body for electric current, the connection body being arranged to be pressed against the semi-conductor system by a compressing means comprising a pressure body pressed against the connection body, the connection body and the pressure body having surfaces facing each other, characterised in that the surfaces of the connection body and the pressure body facing each other are doubly curved surfaces (arched non-developable surfaces).

The compressing means preferably comprises an external pressure member which presses the pressure body against the connection body. In a semi-conductor device in which the semi-conductor system is arranged on a base which is in heat-conducting contact with a cooling body or itself acts as cooling body, a mechanically strong cap attached to the base or the cooling body may with advantage be used as external pressure member.

According to one embodiment of such a semi-conductor device the cap may have a screw operating in the pressure direction of the pressure body, by which the pressure body can be pressed against the connection body.

According to a particularly advantageous embodiment of the invention the doubly curved surfaces are spherical surfaces. According to a further particularly advantageous embodiment of the invention the compressed body as a whole is spherical. Such a shape makes the body particularly resistant to pressure, which enables the body to be made of insulating material without risk of it being damaged by the pressure.

The semi-conductor system may consist of a semi-conductor disc of, for instance, silicon or germanium which is provided on one or both sides with thin metal layers applied on the semi-conductor disc by, for example, vapour deposition, cathode sputtering or electrolytic deposition. The metal layers may also be applied when doping the semi-conductor disc or during a separate process afterwards. As examples of metals in the layers may be mentioned gold, silver, copper, aluminium, nickel, lead and alloys containing one of these metals. The semi-conductor system may, among other things, consist of a semi-conductor disc supplied on one or both sides with supporting plates of molybdenum, tungsten, fernico or other material having approximately the same coefficient of thermal expansion as the semi-conductor disc. Such support plates may be attached to the semi-conductor disc in conventional manner. It is also possible to completely omit the metal layer and supporting plates on the sides of the semi-conductor disc. The semi-conductor system then consists only of the semi-conductor disc. In the last mentioned case it is suitable to use semi-conductor discs with highly doped outer surfaces.

BRIEF DESCRIPTION OF THE DRAWINGS

The invention will be explained more fully by describing a number of embodiments with reference to the accompanying drawings in which.

DESCRIPTION OF THE PREFERRED EMBODIMENTS

Figure 1:
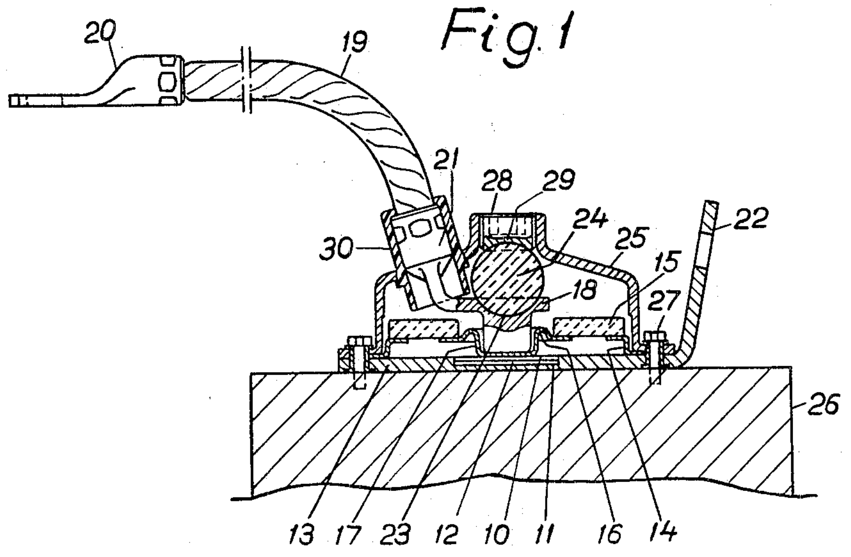
FIG. 1 is a section through a semi-conductor device according to the invention in its current direction, FIG. 2 the same semi-conductor device seen from above, FIG. 3 a detail in the device according to FIG. 1 in modified design, FIG. 4 a section through another semi-conductor device according to the invention in its current direction, FIG. 5 the semi-conductor device according to FIG. 4 seen from above, and FIG. 6 a modification of the device according to FIGS. 1–3.

The diodes shown in the figures are intended for a current strength of, for example, 150 amperes. A circular silicon disc 10 of p-n-n+ type is soldered on the under side by an aluminium layer, not shown, to a supporting plate 11 of molybdenum or other material having approximately the same coefficient of thermal expansion as silicon and provided on the upper side with an alloyed gold-antimony contact in the form of a layer 12. The semi-conductor system consisting of the elements 10, 11 and 12 is hermetically enclosed in a casing comprising a base 13 of, for example, copper, aluminum, silumin or other metallic material having good heat-conducting capacity and a cover consisting of the circular parts 14, 15 and 16. The parts 14 and 16 may consist, for example, of copper, molybdenum, tungsten, iron-nickel alloy or iron-nickel-cobalt alloy and the part 15 of, for example, ceramic or porcelain. When mounting the casing, the parts 14 and 16 are first attached to the ring 15, for example by hard soldering with silver solder. The cover thus obtained consisting of the parts 14, 15 and 16 is then placed above the base 13, the semi-conductor system having already been arranged in position, after which the casing is hermetically sealed at the periphery of the part 14. If sealing is carried out by cold-press welding, the parts 13 and 14 must of course consist of a material which can be cold-press welded, for example copper. If sealing is carried out, for example, by soldering the parts may consist of any of the above exemplified materials. The counter electrode 18 abuts the outside of the cover in the cylindrical recess 17 in the part 16 and acts as connection body, the upper surface 23 being curved. The counter electrode is connected to the connection conductor 19 which has a cable socket 20 and is provided with connecting sleeve 21. The connection conductor of the base is designated 22.

Figure 2:
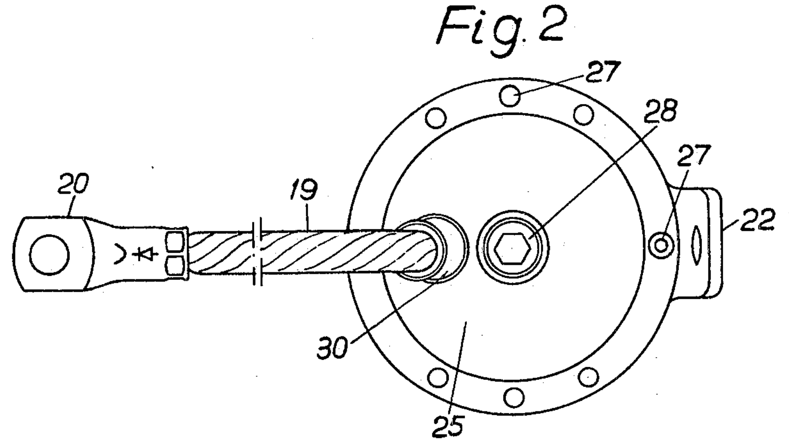

In accordance with FIGS. 1 and 2 the counter electrode 18 is pressed against the part 17 in the cover which is thus simultaneously pressed against the semi-conductor system with the round ball 24 of an inorganic electrically insulating material such as, for example, ceramic, porcelain, glass. The ball which functions as the pressure body may also consist of an organic electrically insulating material such as a resin with added filler, for example, an epoxy resin, silicon resin or phenolic resin containing a filler such as stone powder, quartz powder, mica dust, glass fibres or wood meal. The ball 24 is pressed against the current terminal with the help of the cap 25 in the form of a curved pressure plate of steel or other metallic material which, like the base 13, is attached to the cooling body 26 by screws 27. The cap which functions as the external pressure member is then shaped and attached to the cooling body so that the required pressure is exercised on the ball 24. The pressure may be increased and, of course, decreased, or be effected only by the compressing screw 28 in the cap, the lower surface 29 of which is curved. In the example shown the surface 23 of the counter electrode 18, as well as the surface 29 of the screw 28, is spherical and coincides with the adjacent surfaces of the ball 24. The surfaces of the counter electrode and the ball need not be spherical as shown in the example. They may, for example, be ellipsoidal or paraboloidal or have a different doubly curved shape with the same radius of curvature and the same centre of curvature. The surfaces of the screw and the ball facing each other may also be, for example, ellipsoidal or paraboloidal or have a different doubly curved shape with the same radius of curvature and the same centre of curvature. These last-mentioned surfaces may even be flat. The connection conductor 19 is insulated from the cap 25 by the sleeve 30 of insulating material such as, for example, glass fibre tape or a resin.

Figure 3:
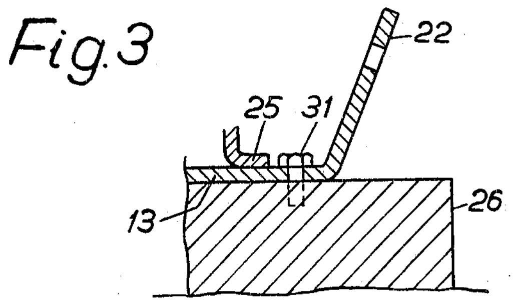

In the embodiment according to FIG. 3 the cap 25 is mounted on the base 13 by soldering or the like, for example welding, and the base 13 is attached to the cooling body 26 by screws 31.

Figure 4:
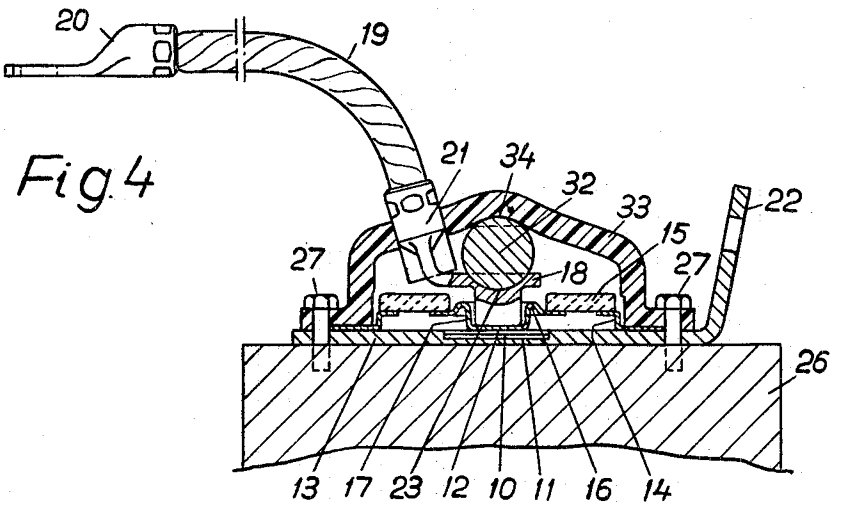
Figure 5:
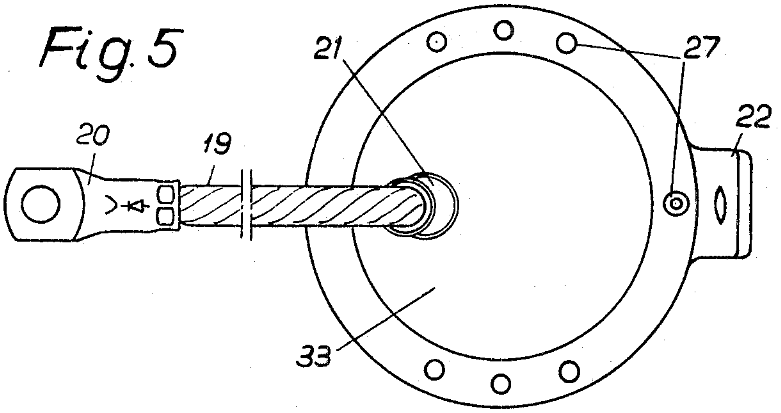

In accordance with FIGS. 4 and 5 the counter electrode 18 is pressed against the part 17 in the cap by a ball 32 of metal, for example steel, copper, aluminium. The ball 32 is pressed against the counter electrode by the cap 33 in the form of a curved pressure plate of a mechanically strong resin, for example of polyester resin, epoxy resin, silicon resin or phenolic resin reinforced by glass fibres, asbestos fibres or other fibrous material which, along with the base 13, is attached to the cooling body 26 by means of screws 27. The cap is then shaped and fixed to the cooling body, or the base, in a manner corresponding to that of FIG. 3 so that the required pressure is exerted on the ball 32. The surface 23 of the counter electrode 18 and the surface 34 of the cap 33 are spherical and coincide with the adjacent surfaces of the ball 32. The surfaces of the counter electrode and ball facing each other, as well as those of the counter electrode and the cap, need not be spherical but may have different shapes, as indicated for corresponding surfaces in the semi-conductor device according to FIGS. 1 and 2 in the description of this semi-conductor device.

Figure 6:
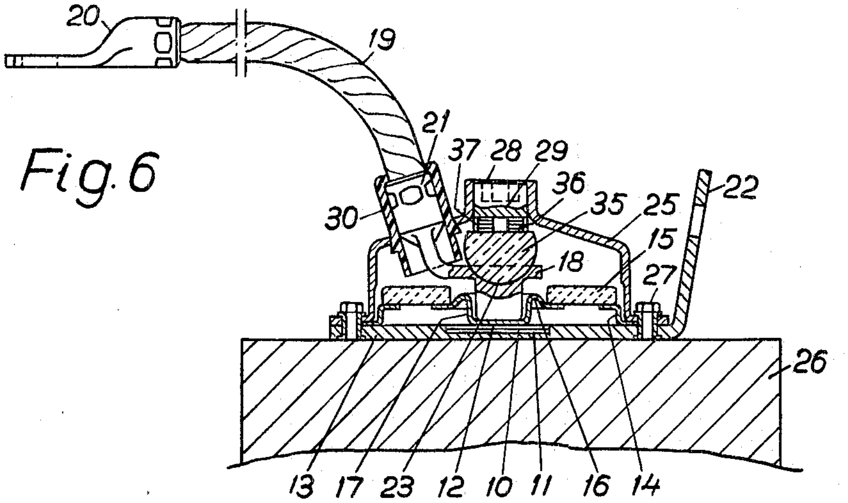

The device according to FIG. 6 is in complete agreement with the device according to FIGS. 1–3 with the exception that the ball 24 is replaced by the body 35 and a spring means 36 in the form of spring washers or a helical spring and that the compressing screw 28 is provided with a collar 37 keeping the member 36 in position. The body 35, which may be of the same material as the ball 24, comprises a sphere with the upper part cut off so that the upper surface is flat.

It is clear that the base in the exemplified devices can be made as a part of the cooling body, that is that the parts 13 and 26 may consist of a single coherent body. In this case the base acts not only as base for the semi-conductor system, but also as cooling body.

If the semi-conductor device consists of a thyristor or transistor the necessary connections for a gate electrode in a thyristor or for a conductor to the base in a transistor, may be arranged for example through holes arranged for this purpose in the part 15 of the cover.

What is claimed is:

1. Semi-conductor device in which a semi-conductor system is arranged in current conducting contact with a connection body for electric current, compressing means for pressing the connection body against the semi-conductor system, said compressing means comprising a pressure body pressed against the connection body, the connection body and the pressure body having surfaces facing each other, the surfaces of the connection body and the pressure body facing each other being mating doubly curved surfaces and the pressure body being of an insulating material.

2. Semi-conductor device according to claim 1, characterized in that the compressing means comprises an external pressure member, which engages the pressure body and presses it against the connection body.

3. Semi-conductor device according to claim 2 in which the semi-conductor system is arranged on cooling body means which comprises a base, characterized in that the external pressure member comprises a cap attached to the cooling body means.

4. Semi-conductor device according to claim 3, characterized in that the cap has a screw operating in the direction of pressure of the pressure body, by which the pressure body can be pressed against the connection body.

5. Semi-conductor device according to claim 1, characterised in that the semi-conductor system is enclosed in a casing having a metallic part against one side of which the semi-conductor system abuts and against the other side of which the connection body abuts.

6. Semi-conductor device according to claim 1, characterised in that the doubly curved surfaces are spherical surfaces.

7. Semi-conductor device according to claim 1, characterised in that the pressure body is spherical.

8. Semi-conductor device according to claim 2, characterised in that a spring member is arranged between the external pressure member and the pressure body.

References Cited

UNITED STATES PATENTS

| | | | |
|---|---|---|---|
| 3,280,389 | 10/1966 | Martin | 317—234 |
| 3,377,523 | 4/1968 | Andersson et al. | 317—234 |
| 3,401,315 | 9/1968 | Scott et al. | 317—234 |
| 3,413,532 | 11/1968 | Boyer | 317—235 |

JOHN W. HUCKERT, Primary Examiner

R. F. POLISSACK, Assistant Examiner

U.S. Cl. X.R.

317—235